US012704031B2

(12) United States Patent
Alanqari et al.

(10) Patent No.: US 12,704,031 B2
(45) Date of Patent: Aug. 11, 2026

(54) METHODS AND COMPOSITIONS FOR VOLCANIC ASH LOST CIRCULATION MATERIALS

(71) Applicant: SAUDI ARABIAN OIL COMPANY, Dhahran (SA)

(72) Inventors: Khawlah Alanqari, Dhahran (SA); Abdullah Al-Yami, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/738,835

(22) Filed: Jun. 10, 2024

(65) Prior Publication Data

US 2025/0376901 A1 Dec. 11, 2025

(51) Int. Cl.
*E21B 21/00* (2006.01)
*C09K 8/035* (2006.01)

(52) U.S. Cl.
CPC ............ *E21B 21/003* (2013.01); *C09K 8/035* (2013.01)

(58) Field of Classification Search
None
See application file for complete search history.

(56) References Cited

U.S. PATENT DOCUMENTS

| | | | | |
|---|---|---|---|---|
| 7,762,329 | B1 | 7/2010 | Morgan et al. | |
| 7,794,537 | B2 | 9/2010 | Barlet-Gouedard et al. | |
| 9,587,160 | B2 | 3/2017 | Athey et al. | |
| 10,087,107 | B2 | 10/2018 | Allouche et al. | |
| 11,162,014 | B2 | 11/2021 | Jones et al. | |
| 11,624,020 | B1 * | 4/2023 | Alanqari | C04B 24/281 166/295 |
| 11,820,708 | B2 | 11/2023 | Alanqari et al. | |
| 2013/0284518 | A1 | 10/2013 | Wu et al. | |
| 2013/0310283 | A1 | 11/2013 | Athey et al. | |
| 2021/0253932 | A1 * | 8/2021 | Pisklak | E21B 33/14 |
| 2021/0292231 | A1 * | 9/2021 | Alanqari | C04B 14/041 |

* cited by examiner

*Primary Examiner* — Andrew Sue-Ako
(74) *Attorney, Agent, or Firm* — Vorys, Sater, Seymour and Pease LLP

(57) ABSTRACT

Materials may be used for mitigation of lost circulation in a subterranean formation. Example methods of lost circulation mitigation may include: introducing a lost circulation material to a zone of interest in a subterranean formation via a wellbore, the zone of interest including depleted zones, zones of low pressure, lost circulation zones, fractured zones, or any combination thereof; wherein the lost circulation material includes: volcanic ash, an activator, and a resinous composition; and solidifying, at least partially, the lost circulation material such that the solidified material at least partially blocks the wellbore from the zone of interest.

19 Claims, 3 Drawing Sheets

METHODS AND COMPOSITIONS FOR VOLCANIC ASH LOST CIRCULATION MATERIALS

FIELD OF THE DISCLOSURE

The present disclosure relates generally to lost circulation materials and related methods.

BACKGROUND OF THE DISCLOSURE

Lost circulation can be encountered when drilling fluid (such as drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various subterranean formations, such as naturally fractured formations, cavernous formations, and highly permeable formations (e.g., formations having a permeability greater than 500 millidarcy). Lost circulation can be categorized by the amount of fluid or mud lost as seepage type, moderate type, severe type, and total loss. The extent of the fluid loss and the ability to control the lost circulation with a lost circulation material depends on the type of formation in which the lost circulation occurs.

One method that has been developed to control lost circulation involves the placement of lost circulation materials into a lost circulation zone (i.e., the sections of a formation into which drilling fluid may be lost). Conventional lost circulation materials may include fibrous, lamellated or granular materials. The lost circulation materials may be placed into the formation, inter alia, as part of a drilling fluid or as a separate lost circulation pill in an attempt to control and/or prevent lost circulation.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

Nonlimiting example methods of the present disclosure may include: introducing a lost circulation material to a zone of interest in a subterranean formation via a wellbore, the zone of interest comprising depleted zones, zones of low pressure, lost circulation zones, fractured zones, or any combination thereof; wherein the lost circulation material comprises: volcanic ash, an activator, and a resinous composition; and solidifying, at least partially, the lost circulation material such that the solidified material at least partially blocks the wellbore from the zone of interest.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
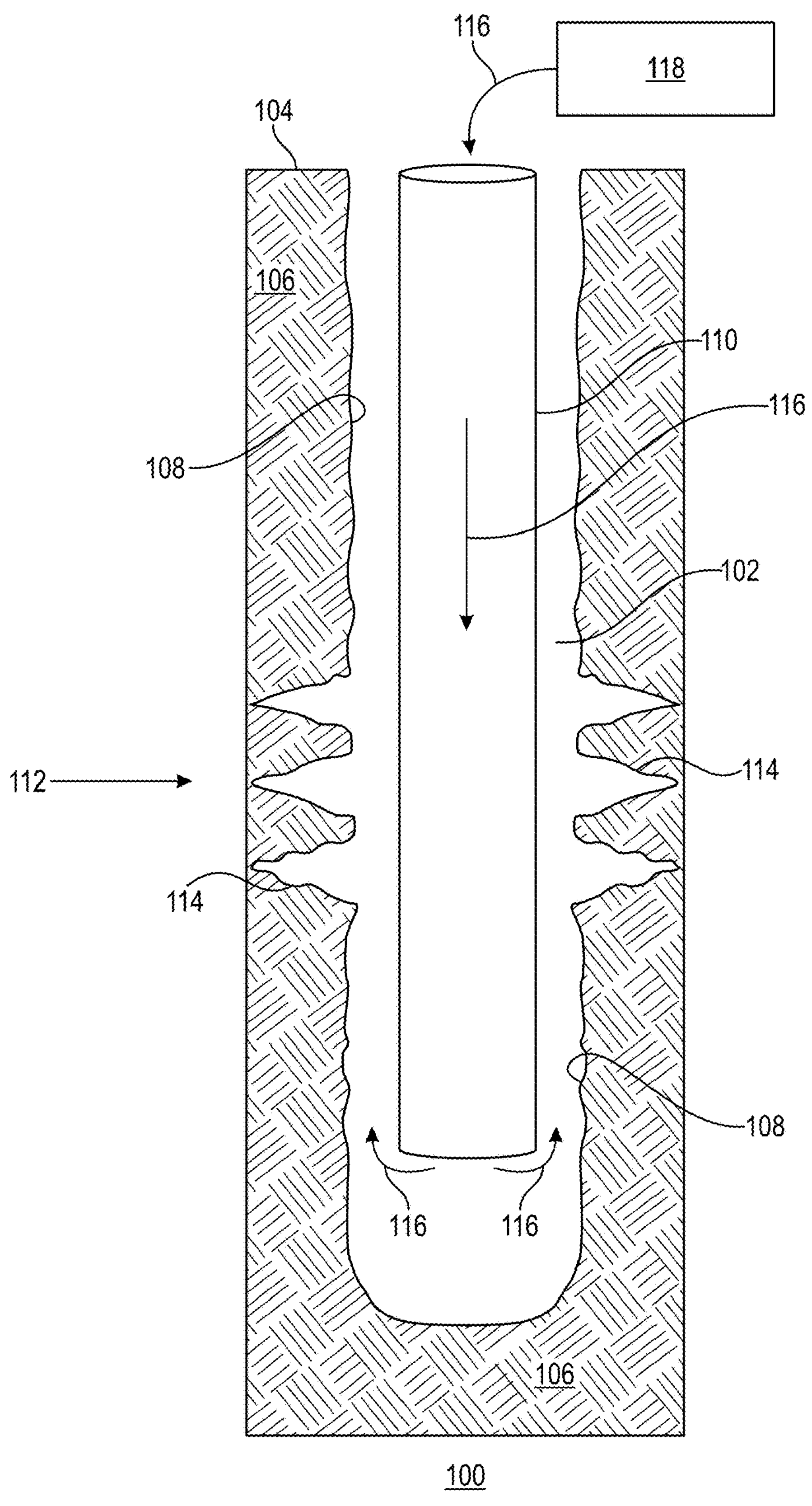
FIG. 1 is diagram of a nonlimiting example well site in accordance with the present disclosure.

Embodiments in accordance with the present disclosure relate generally to lost circulation materials and related methods.

Compositions and methods of the present disclosure may include lost circulation materials. Such lost circulation materials may comprise: volcanic ash, an activator, and a resinous composition including a curing agent. In some embodiments, lost circulation materials of the present disclosure may be developed to form a slurry (e.g., a geopolymer slurry) in combination with a resinous composition (e.g., an epoxy resin system). The slurry and the resinous composition may be combined to form a singular composition comprising lost circulation material for use in a subterranean formation. Such lost circulation materials may subsequently be at least partially solidified to allow for curing of losses within the subterranean formation.

"At least partially solidified," and grammatical variations thereof, as used herein, refer to solidification of lost circulation materials to a state where lost circulation materials may provide functionality of curing losses. It is to be understood that various components of lost circulation materials of the present disclosure may thicken, set, or otherwise solidify to various states. Furthermore, various components of lost circulation materials of the present disclosure may solidify through various physical and/or chemical means. As a nonlimiting example, lost circulation materials of the present disclosure may be introduced to a subterranean formation and subsequently resinous compositions therein may cure through polymerization of components therein, volcanic ash components may undergo a polycondensation of silicate and/or aluminate monomers therein, and/or, furthermore, resinous compositions may bind with volcanic ash of the lost circulation material, all thereby at least partially solidifying the lost circulation material.

Furthermore, it should be noted that lost circulation materials of the present disclosure may undergo the at least partial solidification for a setting time. "Setting time," and grammatical variations thereof, as used herein, refers to an elapsed time from activation of lost circulation materials of the present disclosure to being in a state where lost circulation materials may provide functionality of mitigating losses. Setting time may include curing time of resinous compositions within the lost circulation materials, and may include time for polycondensation of monomers of volcanic ash within the lost circulation materials. It should be noted that setting time may be affected by curing time and/or time for polycondensation of monomers. "Activation," and grammatical variations thereof, as used herein, refers to whereby components of lost circulation materials of the present disclosure may begin undergoing chemical and/or physical reaction towards the at least partial solidification through addition of one or more compounds (e.g., an activator, a curing agent, the like, or any combination thereof) to initiate said reaction. As a first nonlimiting example, at least partial solidification through polycondensation of volcanic ash may be activated through combination with an activator, as described herein. Furthermore, as a second nonlimiting example, at least partial solidification of resinous compositions through curing may be activated through combination with a curing agent, as described herein.

Methods and compositions of the present disclosure may allow for curing of losses with increased efficiency and decreased cost. Furthermore, compositions of the present disclosure may allow for reduced setting time of lost circulation material upon introduction to a subterranean formation.

It should be noted that embodiments of the present disclosure may include compositions and methods related thereto wherein lost circulation materials may be substantially free of ordinary Portland cement (OPC). "Substantially free," and grammatical variations thereof, as used herein may refer to a composition having 0 wt % to 10 wt %, or 0 wt % to 5 wt %, or 0 wt % to 1 wt %, or 0.0001 wt % to 10 wt %, or 0.0001 wt % to 5 wt %, or 0.001 wt % to 1 wt %, or less than 10 wt %, or less than 5 wt %, or less than 1 wt %, or less than 0.1 wt %, or less than 0.001 wt %, of a given component.

Methods and compositions of the present disclosure may include wherein introducing the lost circulation material to the zone of interest comprises introducing a first fluid (e.g., a slurry comprising the volcanic ash) and a second fluid (e.g., a resinous composition), the first fluid comprising the volcanic ash and the activator and the second fluid comprising the resinous composition including the curing agent. The first fluid and the second fluid may be combined before, during, and/or upon delivery of the fluids to the subterranean formation and the zone of interest therein. In some embodiments the first fluid and the second fluid may be contacted and mixed to form a combined fluid prior to introduction to a subterranean formation, thus introducing combined fluid to a subterranean formation and zone of interest therein. Upon combination, the first fluid and the second fluid may be contacted, so as to mix the volcanic ash, the activator, the resinous composition (including the resin and the curing agent), at least partially solidifying the lost circulation material, and thus utilizing the lost circulation material in curing losses within a zone of interest in a subterranean formation.

"Fluid," and grammatical variations thereof, may refer to any flowable composition that does not have a fixed shape and yields to pressure; it is understood that a "fluid" may include a solid, a liquid, a gas, or any combination thereof. "Slurry," and grammatical variations thereof, as used herein, refers to a fluidized mixture comprising particles and a liquid, wherein the particles are generally suspended in the liquid.

Aqueous Fluids

Lost circulation materials of the present disclosure including component fluids may be formulated to include aqueous fluids. Lost circulation materials may include any suitable concentration of aqueous fluid including a balance of aqueous fluid. For example, lost circulation materials of the present disclosure may include aqueous fluid in an amount of 5 weight percent (wt %) to 95 wt %, or 10 wt % to 90 wt %, or 20 wt % to 80 wt %, or 30 wt % to 70 wt %, or 30 wt % to 90 wt %, by total weight of the lost circulation material.

In some embodiments, when compositions are formulated as a first fluid (including volcanic ash and activator) and a second fluid (including resinous composition and curing agent), the first fluid may include an aqueous fluid. In some embodiments, the first fluid may comprise 10 weight percent (wt %) to 70 wt % aqueous solution, by weight of volcanic ash (BWOV). In some embodiments, the first fluid may comprise 10 wt % to 40 wt %, or 10 wt % to 30 wt %, or 10 wt % to 20 wt %, or 20 wt % to 40 wt %, or 25 wt % to 35 wt %, or 20 wt % to 30 wt % aqueous fluid, BWOV. As a nonlimiting illustrative example, an example first fluid including 10 grams (g) volcanic ash may include 4 g aqueous fluid for a 40 wt % BWOV aqueous fluid concentration. As described herein in various nonlimiting examples of the present disclosure, a first fluid and a second fluid may be combined before, during, and/or upon delivery of the fluids to the subterranean formation and the zone of interest therein.

Aqueous fluids included in compositions of the present disclosure may include any suitable aqueous fluids. The aqueous fluids may include, for example, deionized water, tap water, fresh water, salt water, natural or synthetic brine, municipal water, formation water, produced water, well water, filtered water, distilled water, sea water, other type of water, or any combination thereof. In some embodiments, the aqueous fluids may include one or more inorganic compounds dissolved in the aqueous fluids or otherwise completely miscible with the aqueous fluids. In some embodiments, the aqucous fluids may contain brine, including natural and synthetic brine. In some embodiments, salt or other organic compounds may be incorporated into the aqueous fluids to control certain properties of the fluids, and thus the lost circulation material or component fluids thereof, such as density. Without being bound by any particular theory, increasing the saturation of the aqueous fluids by increasing the salt concentration or the level of other organic compounds in the aqueous fluids may increase the density of the aqucous fluids, and thus, the lost circulation material density. Examples of suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, the like, or any combination thereof.

Volcanic Ash

Lost circulation materials of the present disclosure may include volcanic ash. Volcanic ash may function to support at least partial solidification of lost circulation material, and may provide strength properties to lost circulation material. Volcanic ash may function to form a geopolymer. Lost circulation materials may include volcanic ash at concentrations including 10 wt % to 90 wt %, or 20 wt % to 80 wt %, or 30 wt % to 70 wt %, or 30 wt % to 90 wt %, by total weight of the lost circulation material.

Volcanic ash of the present disclosure may comprise any suitable volcanic ash. "Volcanic ash," and grammatical variations thereof, as used herein, may include any suitable particulates wherein a majority of said particulates are of volcanic origin.

The volcanic ash may preferably comprise Saudi Arabian volcanic ash. Preferred compositions of volcanic ash may comprise minerals including, but not limited to, $SO_3$, CaO, $SiO_2$, $Al_2O_3$, $Fe_2O_3$, MgO, and $K_2O$. Preferred compositions of volcanic ash may comprise 30 wt % to 60 wt %, or 40 wt % to 50 wt %, or 42 wt % to 46 wt % $SiO_2$, by weight of the volcanic ash. Preferred compositions of volcanic ash may comprise 10 wt % to 20 wt %, or 13 wt % to 17 wt % $Al_2O_3$, by weight of the volcanic ash. Preferred compositions of volcanic ash may comprise 2 wt % to 20 wt %, or 10 wt % to 15 wt % $Fe_2O_3$, by weight of the volcanic ash.

Volcanic ash may have any suitable size particles including, but not limited to an average particle size of 1 μm (microns) to 100 μm, or 10 μm to 50 μm, or 20 μm to 30 μm, or 20 μm to 50 μm, or 10 μm to 30 μm. Volcanic ash of the present disclosure may be substantially free of $TiO_2$.

The volcanic ash may comprise 2 wt % to 25 wt %, or 2 wt % to 20 wt %, or 2 wt % to 15 wt %, or 2 wt % to 10 wt %, or 2 wt % to 8 wt %, or 2 wt % to 5 wt %, or 5 wt % to 25 wt %, or 5 wt % to 20 wt %, or 5 wt % to 15 wt %, or 5 wt % to 10 wt %, or 5 wt % to 8 wt %, or 8 wt % to 25 wt %, or 8 wt % to 20 wt %, or 8 wt % to 15 wt %, or 8 wt % to 10 wt %, or 10 wt % to 25 wt %, or 10 wt % to 20 wt %, or 10 wt % to 15 wt % CaO, by weight of the volcanic ash.

The volcanic ash may comprise 30 wt % to 70 wt %, or 30 wt % to 60 wt %, or 30 wt % to 55 wt %, or 30 wt % to 50 wt %, or 30 wt % to 45 wt %, or 30 wt % to 40 wt %, or 35 wt % to 70 wt %, or 35 wt % to 60 wt %, or 35 wt % to 55 wt %, or 35 wt % to 50 wt %, or 35 wt % to 45 wt %, or 35 wt % to 40 wt %, or 40 wt % to 70 wt %, or 40 wt % to 60 wt %, or 40 wt % to 55 wt %, or 40 wt % to 50 wt %, or 40 wt % to 45 wt %, or 45 wt % to 70 wt %, or 45 wt % to 60 wt %, or 45 wt % to 55 wt %, or 45 wt % to 50 wt %, or 50 wt % to 70 wt %, or 50 wt % to 60 wt %, or 50 wt % to 55 wt % $SiO_2$, by weight of the volcanic ash.

The volcanic ash may comprise 2 wt % to 40 wt %, or 2 wt % to 35 wt %, or 2 wt % to 30 wt %, or 2 wt % to 25 wt %, or 2 wt % to 20 wt %, or 2 wt % to 15 wt %, or 2 wt % to 10 wt %, or 2 wt % to 5 wt %, or 5 wt % to 40 wt %, or 5 wt % to 35 wt %, or 5 wt % to 30 wt %, or 5 wt % to 25 wt %, or 5 wt % to 20 wt %, or 5 wt % to 15 wt %, or 5 wt % to 10 wt %, or 10 wt % to 40 wt %, or 10 wt % to 35 wt %, or 10 wt % to 30 wt %, or 10 wt % to 25 wt %, or 10 wt % to 20 wt %, or 10 wt % to 15 wt %, or 15 wt % to 40 wt %, or 15 wt % to 35 wt %, or 15 wt % to 30 wt %, or 15 wt % to 25 wt %, or 15 wt % to 20 wt %, or 20 wt % to 40 wt %, or 20 wt % to 35 wt %, or 20 wt % to 30 wt %, or 20 wt % to 25 wt % $Al_2O_3$, by weight of the volcanic ash. The volcanic ash may comprise 2 wt % to 30 wt %, or 2 wt % to 25 wt %, or 2 wt % to 20 wt %, or 2 wt % to 15 wt %, or 2 wt % to 13 wt %, or 2 wt % to 10 wt %, or 2 wt % to 8 wt %, or 2 wt % to 5 wt %, or 5 wt % to 30 wt %, or 5 wt % to 25 wt %, or 5 wt % to 20 wt %, or 5 wt % to 15 wt %, or 5 wt % to 13 wt %, or 5 wt % to 10 wt %, or 5 wt % to 8 wt %, or 8 wt % to 30 wt %, or 8 wt % to 25 wt %, or 8 wt % to 20 wt %, or 8 wt % to 15 wt %, or 8 wt % to 13 wt %, or 8 wt % to 10 wt %, or 10 wt % to 30 wt %, or 10 wt % to 25 wt %, or 10 wt % to 20 wt %, or 10 wt % to 15 wt %, or 10 wt % to 13 wt %, or 13 wt % to 30 wt %, or 13 wt % to 25 wt %, or 13 wt % to 20 wt %, or 13 wt % to 15 wt %, or 15 wt % to 30 wt %, or 15 wt % to 25 wt %, or 15 wt % to 20 wt % $Fe_2O_3$, by weight of the volcanic ash. The volcanic ash may comprise 2 wt % to 25 wt %, or 2 wt % to 20 wt %, or 2 wt % to 15 wt %, or 2 wt % to 10 wt %, or 2 wt % to 8 wt %, or 2 wt % to 5 wt %, or 5 wt % to 25 wt %, or 5 wt % to 20 wt %, or 5 wt % to 15 wt %, or 5 wt % to 10 wt %, or 5 wt % to 8 wt %, or 8 wt % to 25 wt %, or 8 wt % to 20 wt %, or 8 wt % to 15 wt %, or 8 wt % to 10 wt %, or 10 wt % to 25 wt %, or 10 wt % to 20 wt %, or 10 wt % to 15 wt % MgO, by weight of the volcanic ash. The volcanic ash may comprise 0.2 wt % to 10 wt %, or 0.2 wt % to 7 wt %, or 0.2 wt % to 5 wt %, or 0.2 wt % to 3 wt %, or 0.2 wt % to 2 wt %, or 0.2 wt % to 1 wt %, or 0.2 wt % to 0.5 wt %, or 0.5 wt % to 10 wt %, or 0.5 wt % to 7 wt %, or 0.5 wt % to 5 wt %, or 0.5 wt % to 3 wt %, or 0.5 wt % to 2 wt %, or 0.5 wt % to 1 wt %, or 1 wt % to 10 wt %, or 1 wt % to 7 wt %, or 1 wt % to 5 wt %, or 1 wt % to 3 wt %, or 1 wt % to 2 wt %, or 2 wt % to 10 wt %, or 2 wt % to 7 wt %, or 2 wt % to 5 wt %, or 1 wt % to 3 wt %, or 3 wt % to 10 wt %, or 3 wt % to 7 wt %, or 3 wt % to 5 wt %, or 5 wt % to 10 wt %, or 5 wt % to 7 wt % $K_2O$, by weight of the volcanic ash.

The volcanic ash may preferably comprise 0.05 wt % to 2 wt % $SO_3$, 0.05 wt % to 0.2 wt % $SO_3$, 5 wt % to 10 wt % CaO, 40 wt % to 50 wt % $SiO_2$, 10 wt % to 20 wt % $Al_2O_3$, 10 wt % to 15 wt % $Fe_2O_3$, 5 wt % to 10 wt % MgO, and 0.5 wt % to 5 wt % $K_2O$, all by weight of the volcanic ash.

Activator

Along with the aqueous solution and volcanic ash, the lost circulation material may include an activator. The lost circulation material may include any suitable amount of activator, including, but not limited to, for example, 10 wt % to 85 wt %, or 10 wt % to 30 wt %, or 30 wt % to 85 wt %, or 65 wt % to 85 wt %, 50 wt % to 85 wt %, or 60 wt % to 85 wt % activator, based on the total weight of the lost circulation material. The activator may preferably include sodium silicate ($Na_2SiO_3$) and/or sodium hydroxide (NaOH). When included therein, the activator may comprise the $Na_2SiO_3$ at a concentration of 25 wt % to 75 wt %, or 25 wt % to 50 wt %, or 50 wt % to 75 wt %, or 40 wt % to 70 wt %, or 50 wt % to 70 wt %, or 25 wt % to 35 wt %, by weight of the activator. The $Na_2SiO_3$ may have a weight ratio of $Na_2O$ to $SiO_2$ of from 0.250:1 to 0.350:1, from 0.250:1 to 0.330:1, from 0.250:1 to 0.300:1, from 0.250:1 to 0.270:1, from 0.270:1 to 0.350:1, from 0.270:1 to 0.330:1, from 0.270:1 to 0.300:1, from 0.300:1 to 0.350:1, from 0.300:1 to 0.330:1, or from 0.330:1 to 0.350:1. When included therein, the activator may comprise the NaOH at a concentration of 15 wt % to 50 wt %, or 25 wt % to 50 wt %, or 15 wt % to 30 wt %, or 15 wt % to 40 wt %, or 15 wt % to 25 wt %, or 25 wt % to 35 wt %, by weight of the activator.

The lost circulation material may have a pH of greater than 7. In some embodiments, the lost circulation material may have a pH of from 8 to 14, from 9 to 13, from 10 to 13, from 11 to 13, from 11.5 to 13.0, from 11.6 to 13.0, from 11.6 to 12.5, or from 11.6 to 12.0. In some embodiments, NaOH may be used as a pH control additive such that the activation solution has a pH of from 7 to 14, from 7 to 12, from 7 to 11, from 7 to 10, from 7 to 9, from 8 to 14, from 8 to 12, from 8 to 11, from 8 to 10, from 8 to 9, from 9 to 14, from 9 to 12, from 9 to 11, from 9 to 10, from 10 to 14, from 10 to 12, from 10 to 11, from 11 to 14, from 11 to 13, from 11 to 12, from 11.6 to 14, from 11.6 to 13, from 12 to 13, greater than 8, greater than 9, greater than 10, greater than 10.5, greater than 11, or greater than 11.6 when NaOH is present. Without intending to be bound by theory, NaOH may be used as a pH control additive to prevent corrosion of components introduced into the subterranean formation. It is contemplated that the alkaline environment (when the pH is as described previously) may dissolve the alumina and silica, and allow for silicon and aluminum tetrahedral to form, thereby forming a slurrified form of the lost circulation material by sharing oxygen atoms and promoting at least partial solidification of the lost circulation material. A pH as described previously may accelerate the dissolution of the alumina and silica, thereby accelerating the formation of the slurrified form of the lost circulation material and the at least partial solidification of the lost circulation material.

In some embodiments, the lost circulation material, in particular the lost circulation material in slurrified form, may include a sodium aluminosilicate hydrate. This sodium aluminosilicate hydrate may be a reaction product of the volcanic ash, $Na_2SiO_3$, and NaOH. Specifically, a polycondensation of silicate and aluminate monomers (from the volcanic ash) under alkaline conditions (due to the addition of NaOH and $Na_2SiO_3$) may occur, forming the sodium aluminosilicate hydrate. The ratio of $Na_2O$ and NaOH to $Al_2O_3$ in the slurrified form of the lost circulation material of the present disclosure may range from 0.30:1.00 to 0.90:1.00, from 0.30:1.00 to 0.80:1.00, from 0.30:1.00 to 0.75:1.00, from 0.30:1.00 to 0.70:1.00, from 0.30:1.00 to 0.65:1.00, from 0.30:1.00 to 0.60:1.00, from 0.30:1.00 to 0.55:1.00, from 0.30:1.00 to 0.50:1.00, from 0.30:1.00 to 0.40:1.00, from 0.40:1.00 to 0.90:1.00, from 0.40:1.00 to 0.80:1.00, from 0.40:1.00 to 0.75:1.00, from 0.40:1.00 to 0.70:1.00, from 0.40:1.00 to 0.65:1.00, from 0.40:1.00 to 0.60:1.00, from 0.40:1.00 to 0.55:1.00, from 0.40:1.00 to 0.50:1.00, from 0.50:1.00 to 0.90:1.00, from 0.50:1.00 to 0.80:1.00, from 0.50:1.00 to 0.75:1.00, from 0.50:1.00 to 0.70:1.00, from 0.50:1.00 to 0.65:1.00, from 0.50:1.00 to 0.60:1.00, from 0.50:1.00 to 0.55:1.00, from 0.55:1.00 to 0.90:1.00, from 0.55:1.00 to 0.80:1.00, from 0.55:1.00 to 0.75:1.00, from 0.55:1.00 to 0.70:1.00, from 0.55:1.00 to 0.65:1.00, from 0.55:1.00 to 0.60:1.00, from 0.60:1.00 to 0.90:1.00, from 0.60:1.00 to 0.80:1.00, from 0.60:1.00 to 0.75:1.00, from 0.60:1.00 to 0.70:1.00, from 0.60:1.00 to 0.65:1.00, from 0.65:1.00 to 0.90:1.00, from 0.65:1.00 to 0.80:1.00, from 0.65:1.00 to 0.75:1.00, from 0.65:1.00 to 0.70:1.00, from 0.70:1.00 to 0.90:1.00, from 0.70:1.00 to 0.80:1.00, from 0.70:1.00 to 0.75:1.00, from 0.75:1.00 to 0.90:1.00, from 0.75:1.00 to 0.80:1.00, or from 0.80:1.00 to 0.90:1.00.

In embodiments, the ratio of $Na_2SiO_3$ combined with NaOH to $Al_2O_3$ may range from 0.5:1.0 to 9.0:1.0, from 0.5:1.0 to 7.0:1.0, from 0.5:1.0 to 5.0:1.0, from 0.5:1.0 to 3.0:1.0, from 0.5:1.0 to 2.0:1.0, from 0.5:1.0 to 1.5:1.0, from 0.5:1.0 to 1.0:1.0, from 1.0:1.0 to 9.0:1.0, from 1.0:1.0 to 7.0:1.0, from 1.0:1.0 to 5.0:1.0, from 1.0:1.0 to 3.0:1.0, from 1.0:1.0 to 2.0:1.0, from 1.0:1.0 to 1.5:1.0, from 1.5:1.0 to 9.0:1.0, from 1.5:1.0 to 7.0:1.0, from 1.5:1.0 to 5.0:1.0, from 1.5:1.0 to 3.0:1.0, from 1.5:1.0 to 2.0:1.0, from 2.0:1.0 to 9.0:1.0, from 2.0:1.0 to 7.0:1.0, from 2.0:1.0 to 5.0:1.0, from 2.0:1.0 to 3.0:1.0, from 3.0:1.0 to 9.0:1.0, from 3.0:1.0 to 7.0:1.0, from 3.0:1.0 to 5.0:1.0, from 5.0:1.0 to 9.0:1.0, from 5.0:1.0 to 7.0:1.0, or from 7.0:1.0 to 9.0:1.0.

Sodium aluminosilicate hydrates of the present disclosure may have a formula of $Na_n\ [(\text{—}SiO_2)_z\text{—}AlO_2]_n \cdot yH_2O$, where n represents a degree of polymerization ranging from 1 to 50, from 1 to 40, from 1 to 30, from 1 to 25, from 1 to 20, from 1 to 15, from 1 to 10, from 1 to 5, from 5 to 50, from 5 to 40, from 5 to 30, from 5 to 25, from 5 to 20, from 5 to 15, from 5 to 10, from 10 to 50, from 10 to 40, from 10 to 30, from 10 to 25, from 10 to 20, from 10 to 15, from 15 to 50, from 15 to 40, from 15 to 30, from 15 to 25, from 15 to 20, from 20 to 50, from 20 to 40, from 20 to 30, from 20 to 25, from 25 to 50, from 25 to 40, from 25 to 30, from 30 to 50, from 30 to 40, or from 40 to 50, z represents an amount of silicate ranging from 2 to 10, from 2 to 8, from 2 to 6, from 2 to 5, from 2 to 4, from 4 to 10, from 4 to 8, from 4 to 6, from 4 to 5, from 5 to 10, from 5 to 8, from 5 to 6, from 6 to 10, from 6 to 8, or from 8 to 10, and y represents a molar amount of water ranging from 2 to 15, from 3 to 12, from 4 to 12, from 5 to 15, from 10 to 15, from 2 to 9, or from 2 to 5. Sodium aluminosilicate hydrates of the present disclosure may have a structure as shown in Structure 1:

Structure 1

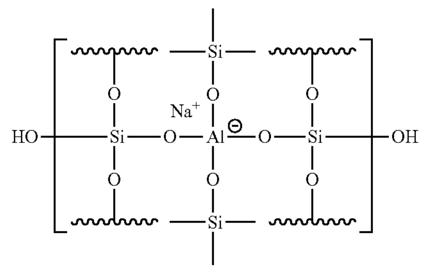

Resin

The lost circulation material may further include a resinous composition including a resin (e.g., a curable resin (e.g., an epoxy resin)). As used herein, a "resin" refers to a substance of plant or synthetic origin that is typically convertible into polymers, and may be a mixture of organic compounds such as terpenes, an organic compound produced by plants. As used herein, a "resinous composition" refers to a composition including a resin and other supporting components including, but not limited to, for example, a curing agent, an emulsifier, a weighting material, an accelerator, a diluent, the like, or any combination thereof. It should be noted that resinous compositions of the present disclosure may be formulated as a separate fluid (e.g., a second fluid) in addition to other compositions of the present disclosure (e.g., a first fluid (e.g., a slurry including volcanic ash)). Resinous compositions of the present disclosure may subsequently be delivered to a subterranean formation within a second fluid, or may be combined with a first fluid (e.g., a slurry including volcanic ash) prior to introduction to a subterranean formation to form a combined fluid (e.g., including a slurry including volcanic ash and a resinous composition). Resinous compositions of the present disclosure may include a resin, curing agent, optionally an emulsifier, and optionally weighting material.

The resin included in resinous compositions of the present disclosure may comprise 50 wt % to 97 wt %, or 50 wt % to 80 wt %, or 80 wt % to 97 wt %, or 97 wt % or greater of epoxy resin, by weight of the resinous compositions. It should further be noted that lost circulation materials of the present disclosure may comprise resinous composition at concentrations including 10 wt % to 90 wt %, or 20 wt % to 80 wt %, or 30 wt % to 70 wt %, or 30 wt % to 90 wt %, or 20 wt % to 40 wt %, or 15 wt % to 45 wt %, or 30 wt % to 40 wt %, or about 33 wt %, or 32 wt % to 34 wt %, based on a total weight of the lost circulation material.

The epoxy resin may comprise at least one of 1,6-hexanediol diclycidyl ether, alkyl glycidyl ethers having from 12 to 14 carbon atoms, 2,3-epoxypropyl o-tolyl ether, bisphenol-A-epichlorohydrin epoxy resin, or a compound having Formula I Formula I

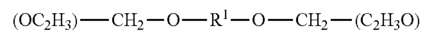

$$(OC_2H_3)\text{—}CH_2\text{—}O\text{—}R^1\text{—}O\text{—}CH_2\text{—}(C_2H_3O)$$

where $R^1$ is a linear or branched hydrocarbyl having from 4 to 24 carbon atoms. The epoxy resin may comprise compounds including, but not limited to, bisphenol-A-based epoxy resins, bisphenol-F-based epoxy resins, aliphatic epoxy resins, Novalac resins, the like, or any combination thereof. In some embodiments, the epoxy resin may comprise compounds including, but not limited to, epichlorohydrin, butyl glycidyl ether, cyclohexanedimethanol, cyclohexanedimethanol diglydicyl ether, the like, or any combination thereof. Aliphatic epoxy resins may have Formula I, where $R^1$ may be a linear or branched hydrocarbyl having from 4 to 24 carbon atoms, such as from 4 to 20, from 4 to 16, from 4 to 12, from 4 to 8, from 6 to 24, from 6 to 20, from 6 to 16, or from 6 to 12 carbon atoms. In some embodiments, $R^1$ may be an alkyl group. For example, in one embodiment, the epoxy resin may include 1,6-hexanediol diglycidyl ether, which has Formula II:

Formula II

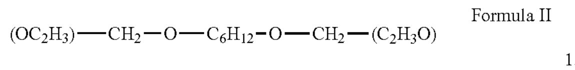

In some embodiments, the epoxy resin may have an epoxy value of from 4.5 epoxy equivalents per kilogram of the epoxy resin to 5.5 epoxy equivalents per kilogram of the epoxy resin. The epoxy equivalent weight of an epoxy resin is the weight of the epoxy resin in grams that contains one equivalent weight of epoxy. The epoxy equivalent weight of the epoxy resin is equal to the molecular weight of the epoxy resin divided by the average number of epoxy groups in the epoxy resin. The epoxy resins may have an epoxy equivalent weight of from 170 to 350 grams of resin per epoxy equivalent (g/eq). The epoxy value and epoxy equivalent weight of an epoxy resin may be determined according to ASTM-D1652. Other methods of determining the epoxy value and epoxy equivalent weight of the epoxy resin may also be used to determine the epoxy value or epoxy equivalent weight of the epoxy resin.

When used in lost circulation materials of the present disclosure, in some embodiments, the epoxy resin may have a viscosity that enables the lost circulation materials to be transferred into the annulus between the exterior surface of the tubular string and the wellbore wall or the interior surface of a casing surrounding the tubular string. In other embodiments, the epoxy resin may have a viscosity that enables introduction of lost circulation materials having the epoxy resin into a zone of interest.

In some embodiments, the epoxy resin may be modified with a reactive diluent. The type and amount of reactive diluent may influence the viscosity, flexibility, hardness, chemical resistance, mechanical properties, plasticizing effect, reactivity, crosslinking density, or other properties of the epoxy resin. In some embodiments, the reactive diluent may be added to the epoxy resin to change the viscosity of the epoxy resin, such as to reduce the viscosity of the epoxy resin. In other embodiments, the reactive diluents may be added to improve at least one of the adhesion, the flexibility, and the solvent resistance of the epoxy resin. The reactive diluent can be a non-functional, mono-functional, di-functional, or multi-functional reactive diluent. For example, a non-functional reactive diluent does not have an epoxide functional group. As used in relation to reactive diluents, the term "functional" refers to the reactive diluent having at least one epoxide functional group. Therefore, a functional reactive diluent may have one, two, three, or more than three epoxide functional groups.

The term "non-functional", as used in relation to reactive diluents, refers to a reactive diluent that does not have at least one epoxide functional group. Thus, a non-functional reactive diluent does not have at least one epoxide functional group, but still participates in at least one chemical reaction during reaction of the epoxide resin. The term "non-reactive diluent" refers to a diluent that does not participate in a chemical reaction during reaction of the epoxy resin. Examples of reactive and non-reactive diluents may include, but are not limited to, propylene glycol diglycidyl ether, butanediol diglycidyl ether, cardanol glycidyl ether derivatives, propanetriol triglycidyl ether, aliphatic monoglycidyl ethers of $C_{13}$-$C_{15}$ alcohols, the like, or combinations of functional or non-functional reactive diluents and non-reactive diluents. In some embodiments, the epoxy resin may include a reactive diluent having Formula III:

Formula III

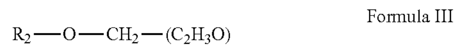

where $R_2$ is a hydrocarbyl having from 12 to 14 carbon atoms. $R_2$ may be linear, branched, or cyclic. In some embodiments, $R_2$ may be an alkyl group.

In some embodiments, the epoxy resin may include an amount of reactive diluent that reduces the viscosity of the epoxy resin. In other embodiments, the epoxy resin may include an amount of reactive diluent that modifies one or more of the adhesion, the flexibility, or the solvent resistance of the epoxy resin. In some embodiments, the epoxy resin may include from 1 wt % to 30 wt % reactive diluent based on the total weight of the epoxy resin portion within the resinous composition. As used in this disclosure, the term "epoxy resin portion" refers to the constituents of the resinous composition that do not include the curing agent, weighting agents, or other additives, such as accelerators or retarders. The epoxy resin portion includes the epoxy resins and any added reactive or non-reactive diluent. In other embodiments, the epoxy resin may include 1 wt % to 20 wt %, or 1 wt % to 16 wt %, or 1 wt % to 14 wt %, or 1 wt % to 12 wt %, or 5 wt % to 30 wt %, or 5 wt % to 20 wt %, or 5 wt % to 16 wt %, or 5 wt % to 14 wt %, or 5 wt % to 12 wt %, or 10 wt % to 30 wt %, or 10 wt % to 20 wt %, or 10 wt % to 16 wt %, or 10 wt % to 14 wt %, or 12 wt % to 30 wt %, or 12 wt % to 20 wt %, or 12 wt % to 16 wt %, or 14 wt % to 30 wt %, or 14 wt % to 20 wt %, or 14 wt % to 16 wt % reactive diluent based on the total weight of the epoxy resin portion of the resinous composition.

In some embodiments, the epoxy resin may include bisphenol-A-(epichlorohydrin) epoxy resin with oxirane mono [($C_{12}$-$C_{14}$)-alkyloxy)methyl] derivatives. The bisphenol-A-epichlorohydrin epoxy resin is an epoxy resin made by reaction of bisphenol-A and epichlorohydrin. The bisphenol-A-(epichlorohydrin) epoxy resin may then be modified with the reactive diluent oxirane mono [($C_{12}$-$C_{14}$)-alkyloxy) methyl] derivatives to reduce the viscosity of the resin and improve the adhesion, flexibility, and solvent resistance of the final resin.

The bisphenol-A-(epichlorohydrin) epoxy resin with the reactive diluent oxirane mono [($C_{12}$-$C_{14}$)-alkyloxy) methyl] derivatives may modify the viscosity of lost circulation materials, or may provide the lost circulation materials with a non-crystalizing resin and improved mechanical and chemical resistance compared to compositions without the bisphenol-A-(epichlorohydrin) epoxy resin with the reactive diluent oxirane mono [($C_{12}$-$C_{14}$)-alkyloxy) methyl] derivatives. In some embodiments, the epoxy resin may include 80 wt % to 90 wt %, or 80 wt % to 88 wt %, or 80 wt % to 86 wt %, or 80 wt % to 84 wt %, or 82 wt % to 90 wt %, or 82 wt % to 88 wt %, or 82 wt % to 86 wt %, or 82 wt % to 84 wt %, or 84 wt % to 90 wt %, or 84 wt % to 88 wt %, or 84 wt % to 86 wt % of the bisphenyl-A-(epichlorohydrin) epoxy resin based on the total weight of the epoxy resin portion of the resinous composition. In some embodiments, the epoxy resin may include 10 wt % to 20 wt %, or 10 wt % to 18 wt %, or 10 wt % to 16 wt %, or 10 wt % to 14 wt %, or 12 wt % to 20 wt %, or 12 wt % to 18 wt %, or 12 wt % to 16 wt %, or 12 wt % to 14 wt %, or 14 wt % to 20 wt %, or 14 wt % to 18 wt %, or 14 wt % to 16 wt % oxirane mono[($C_{12}$-$C_{14}$)-alkyloxy) methyl] derivatives based on the total weight of the epoxy resin portion of the resinous composition.

In some embodiments, the epoxy resin comprising the bisphenol-A-(epichlorohydrin) epoxy resin with the reactive diluent oxirane mono [($C_{12}$-$C_{14}$)-alkyloxy) methyl] derivatives may have an epoxy value of from 4.76 epoxy equivalents per kilogram of epoxy resin to 5.26 epoxy equivalents per kilogram of epoxy resin. The epoxy resin comprising the bisphenol-A-(epichlorohydrin) epoxy resin with the reactive diluent oxirane mono [($C_{12}$-$C_{14}$)-alkyloxy) methyl] derivatives may have an epoxy equivalent weight of 190 g/eq to 210 g/eq and a dynamic viscosity of from 600 millipascal seconds (mPa·s) to 1200 mPa·s, or 600 mPa·s to 900 mPa·s.

In some embodiments, the epoxy resin may include 2,3-epoxypropyl-o-tolyl ether, which may have an epoxy equivalent weight of from 170 g/eq to 190 g/eq and exhibit a dynamic viscosity of from 7 mPa·s to 10 mPa·s. In other embodiments, the epoxy resin may include alkyl glycidyl ethers having from 12 to 14 carbon atoms, which may have an epoxy equivalent weight of from 270 g/eq to 305 g/eq and may exhibit a dynamic viscosity of from 5 mPa·s to 12 mPa·s. In some embodiments, the epoxy resin may include 1,6-hexanediol diclycidyl ether, which may have an epoxy equivalent weight of from 150 g/eq to 170 g/eq and may exhibit a dynamic viscosity of from 20 mPa·s to 30 mPa·s.

In some embodiments, the epoxy resin system may include a plurality of epoxy resins. For example, in some embodiments, the epoxy resin system may include a combination of two or more of bisphenol-A-(epichlorohydrin) epoxy resin, 2,3-epoxypropyl-o-tolyl ether, $C_{12}$-$C_{14}$ alkyl glycidyl ether, or 1,6-hexanediol diglycidyl ether epoxy resin. In one embodiment, the epoxy resin may include a mixture of 1,6-hexanediol diglycidyl ether epoxy resin and bisphenol-A-(epichlorohydrin) epoxy resin with the reactive diluent oxirane mono [($C_{12}$-$C_{14}$)-alkyloxy)methyl] derivatives.

In some embodiments, lost circulation materials of the present disclosure may include an amount of the resin (e.g., epoxy resin) necessary to at least partially solidify the lost circulation material through polymerization and/or curing of the resinous composition. For example, in some embodiments, lost circulation materials may include 20 wt % to 99 wt %, or 20 wt % to 97 wt %, or 20 wt % to 95 wt %, or 20 wt % to 90 wt %, or 20 wt % to 80 wt %, or 20 wt % to 60 wt %, or 40 wt % to 99 wt %, or 40 wt % to 97 wt %, or 40 wt % to 95 wt %, or 40 wt % to 90 wt %, or 40 wt % to 80 wt %, or 40 wt % to 60 wt %, or 60 wt % to 99 wt %, or 60 wt % to 97 wt %, or 60 wt % to 95 wt %, or 60 wt % to 90 wt %, or 60 wt % to 80 wt %, or 80 wt % to 99 wt %, or 80 wt % to 97 wt %, or 80 wt % to 95 wt %, or 80 wt % to 90 wt %, or 90 wt % to 99 wt %, or 90 wt % to 97 wt %, or from 90 wt % to 95 wt % resin based on the total weight of the lost circulation materials before at least partial solidification.

Resinous compositions of the present disclosure may also include a curing agent, including at concentrations of 1 wt % to 30 wt %, or 1 wt % to 20 wt %, or 20 wt % to 30 wt %, or 2 wt % to 30 wt % curing agent, based on the weight of the resinous composition. A curing agent may serve to cure the resin within the resinous composition, thus polymerizing components of the resin so as to at least partially solidify resinous compositions and thus overall lost circulation materials of the present disclosure. The curing agent may include at least one of an amine, polyamine, amine adduct, polyamine adduct, alkanolamine, amide, polyamide, polyamide adduct, polyamide imidazoline, polyaminoamide, phenalkamine, polymercaptan, the like, or any combination thereof. Amines or polyamine curing agents may include, but are not limited to, aliphatic amines, cycloaliphatic amines, modified cycloaliphatic amines such as cycloaliphatic amines modified by polyacrylic acid, aliphatic polyamines, cycloaliphatic polyamines, modified polyamines such as polyamines modified by polyacrylic acid, amine adducts such as cycloaliphatic amine adducts or polyamine adducts, the like, or any combination thereof.

Examples of suitable curing agents may include, but are not limited to, at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), polyoxyproplylene diamine, diethyltoluenediamine, the like, or any combination thereof. Examples of commercially available curing agents may include, but are not limited to, RAZEEN® Cure Products (available from Jubail Chemical Industries), WELLLOCK® H1 (available from Halliburton). It should be noted that in some embodiments, the resinous composition may include a plurality of curing agents.

The curing agent may be an amine curing agent having an amine value that enables the amine curing agent to fully cure a resin of resinous compositions of the present disclosure. The amine value of a curing agent gives the active hydrogen (NH) content of an amine curing agent. The amine value is expressed as the weight in milligrams of potassium hydroxide (KOH) needed to neutralize the NH in 1 gram of the amine curing agent. In some embodiments, the curing agent may have an amine value of 250 milligrams of KOH per gram (mg KOH/g) to 1700 mg KOH/g, or 250 mg KOH/g to 1650 mg KOH/g, or 250 mg KOH/g to 1600 mg KOH/g, or 450 mg KOH/g to 1700 mg KOH/g, or 450 mg KOH/g to 1650 mg KOH/g, or 450 mg KOH/g to 1600 mg KOH/g, or 650 mg KOH/g to 1700 mg KOH/g, or 650 mg KOH/g to 1650 mg KOH/g, or 650 mg KOH/g to 1600 mg KOH/g. The amine value may be determined by titrating a solution of the curing agent with a dilute acid, such as a 1 N solution of hydrogen chloride (HCl). The amine value may then be calculated from the amount of HCl needed to neutralize the amine in the solution according to Equation 1:

$$\frac{V_{HCl} * N_{HCl} * MW_{KOH}}{W} \quad \text{Equation 1}$$

where $V_{HCl}$ is the volume in milliliters of HCl needed to neutralize the amine, $N_{HCl}$ is the normality of HCl used to titrate the amine, $MW_{KOH}$ is the molecular weight of KOH in grams per mole, and W is the weight in grams of the curing agent sample titrated. The amine number of the known pure amine curing agent may be calculated from Equation 2:

$$\frac{1000 * MW_{KOH}}{MW_{curing\ agent}} \quad \text{Equation 2}$$

where $MW_{KOH}$ is the molecular weight of KOH in grams per mole, and $MW_{curing\ agent}$ is the molecular weight of the curing agent in grams per mole.

The amine curing agent may have an amine hydrogen equivalent weight (AHEW) that enables the amine curing agent to fully cure a resin of resinous compositions of the present disclosure. The AHEW of an amine curing agent refers to the grams of the amine curing agent containing 1 equivalent of amine. The AHEW of an amine curing agent may be calculated by dividing the molecular weight of the amine curing agent in grams per mole by the number of active hydrogens per molecule. In some embodiments, the curing agent may be an amine curing agent having an AHEW of 20 grams (g) to 120 g, or 20 g to 115 g, or 20 g to 110 g, or 20 g to 100 g, or 40 g to 120 g, or 40 g to 115 g, or 40 g to 110 g, or 40 g to 110 g, or 60 g to 120 g, or 60 g to 115 g, or 60 g to 110 g determined according to the methods previously described in this disclosure.

The curing time of resinous compositions may be inversely proportional to the amount of curing agent in the resinous composition (and thus the overall amount of curing agent in the lost circulation material). For example, increasing the amount of the curing agent in resinous compositions may result in a decrease in the curing time of the resinous composition. In some embodiments, resinous compositions may include an amount of curing agent capable of curing the resin (e.g., epoxy resin) in the resinous composition to a semi-solid state in a cure time of 4 hours to 12 hours, or 4 hours to 9 hours, or 4 hours to 5 hours. As used in this disclosure, the term "semi-solid" refers to a state of the compositions that is between a liquid and a solid in which the composition exhibits high elasticity and flexibility. In the semi-solid state, resinous compositions may be easily deformed but may return to shape upon releasing the deforming force. The resinous compositions cured to a semi-solid or solid state may support mitigation of lost circulation when included in lost circulation materials introduced to a subterranean formation in accordance with the present disclosure. In some embodiments, resinous compositions of the present disclosure may include 0.1 wt % to 20 wt %, or 0.1 wt % to 15 wt %, or 0.1 wt % to 10 wt %, or 0.1 wt % to 5 wt %, or 0.5 wt % to 20 wt %, or 0.5 wt % to 15 wt %, or 0.5 wt % to 10 wt %, or 0.5 wt % to 5 wt %, or 1 wt % to 20 wt %, or 1 wt % to 15 wt %, or 1 wt % to 10 wt %, or 1 wt % to 5 wt %, or 5 wt % to 20 wt %, or 5 wt % to 15 wt %, or 5 wt % to 10 wt %, or 10 wt % to 20 wt % curing agent based on the total weight of the resinous composition before curing.

In some embodiments, resinous compositions may have a cure time of greater than or equal to 4 hours, greater than or equal to 5 hours, or greater than or equal to 6 hours. In some embodiments, resinous compositions may have a cure time of less than or equal to 12 hours, less than or equal to 10 hours, or less than or equal to 9 hours. In some embodiments, resinous compositions may have a cure time of 4 hours to 12 hours, or 4 hours to 10 hours, or 4 hours to 9 hours, or 4 hours to 6 hours, or 5 hours to 12 hours, or 5 hours to 10 hours, or 5 hours to 9 hours, or 6 hours to 12 hours, or 6 hours to 10 hours, or 6 hours to 9 hours, or 9 hours to 12 hours, or 10 hours to 12 hours.

Resinous compositions of the present disclosure may also include one or more additives to modify the speed of the reaction between the resin and the curing agent or modify other properties of the resinous composition, such as viscosity, yield point (YP), or other rheological properties. For example, in some embodiments, the resinous composition may include an accelerator or a retarder to speed up or slow down the reaction between the resin (e.g., an epoxy resin) and the curing agent. Accelerators may include, but are not limited to, alcohols, phenols, aminoalcohols, or amines. Examples of accelerators may include, but are not limited to, benzyl alcohol, mono-nonylphenol, triethanolamine (TEA), amino-n-propyl diethanolamine, n,n-dimethyldipropylenetramine, the like, or any combination thereof. Examples of retarders may include, but are not limited to, lignin, gums, starches, lignosulphonate derivatives, the like, or any combination thereof.

In some embodiments, resinous compositions may include an amount of the accelerator capable of decreasing the cure time of the resinous composition to 1 hour to 12 hours, or 1 hour to 8 hours, or 1 hour to 5 hours, or 12 hours or less. In some embodiments, the resinous composition may include 0.01 wt % to 10 wt %, or 0.01 wt % to 5 wt %, or 0.01 wt % to 3 wt %, or 0.01 wt % to 1 wt %, or 0.1 wt % to 10 wt %, or 0.1 wt % to 5 wt %, or 0.1 wt % to 3 wt %, or 0.1 wt % to 1 wt %, or 1 wt % to 10 wt %, or 1 wt % to 5 wt %, or 1 wt % to 3 wt % accelerator based on the total weight of the resinous composition prior to curing.

Resinous compositions of the present disclosure may further include one or more weighting materials. The weighting materials may be particulate solids having a specific gravity (SG) that increases the density of resinous compositions. The weighting material may be added to the resinous compositions to increase the density of the final cured resin to increase the hydrostatic pressure exerted by lost circulation materials including such resinous compositions on the wellbore wall or the interior surface of the outer tubular string. The final density of the at least partially solidified lost circulation material including such resinous compositions may depend on the geology of the subterranean formation in the zone of interest where the lost circulation material may be introduced. For example, in some embodiments, the subterranean formation may require lost circulation materials including resinous compositions having a greater density to support the wellbore and prevent flow of fluids from the subterranean formation into the wellbore during at least partial solidification of the lost circulation materials.

The weighting material may have a specific gravity (SG) of from 2 to 6. Examples of weighting materials may include, but are not limited to, sand, barite (barium sulfate), hematite, calcium carbonate, siderite, ilmenite, silica sand, manganese oxide (MnO), hausmanite, manganese tetraoxide ($Mn_3O_4$), zinc oxide, zirconium oxide, iron oxide, the like, or any combination thereof.

Resinous compositions of the present disclosure may include an amount of weighting material that increases the density of the resinous compositions. In some embodiments, resinous compositions may include 0.1 wt % to 40 wt %, or 0.1 wt % to 30 wt %, or 0.1 wt % to 20 wt %, or 0.1 wt % to 10 wt %, or 1 wt % to 40 wt %, or 1 wt % to 30 wt %, or 1 wt % to 20 wt %, or 1 wt % to 10 wt %, or 5 wt % to 40 wt %, or 5 wt % to 30 wt %, or 5 wt % to 20 wt %, or 5 wt % to 10 wt %, or 10 wt % to 40 wt %, or 10 wt % to 30 wt %, or 10 wt % to 20 wt %, or 20 wt % to 40 wt % weighting material based on the total weight of the resinous composition before at least partial solidification. A nonlimiting example resinous compositions may include from 1 wt % to 40 wt % $Mn_3O_4$ as a weighting material, based on the total weight of the resinous composition.

In some embodiments, resinous compositions may include other modifiers, such as cardanol liquid, polyacrylate flow agents, the like, or any combinations thereof.

Modifiers may be added to the resinous compositions to decrease the viscosity of the epoxy resin.

A first nonlimiting example resinous composition may include from 20 wt % to 97 wt % epoxy resin based on the total weight of the composition, where the epoxy resin comprises at least one of 2,3-epoxypropyl o-tolyl ether, alkyl glycidyl ethers having from 12 to 14 carbon atoms, or the compound having Formula 1, where $R^1$ is a linear or branched hydrocarbyl having from 4 to 24 carbon atoms, and from 1 wt % to 20 wt % curing agent based on the total weight of the composition. Alternatively, in a second non-limiting example, the resinous composition may include from 20 wt % to 97 wt % bisphenol-A-(epichlorohydrin) epoxy resin with the reactive diluent oxirane mono [($C_{12}$-$C_{14}$)-alkyloxy)methyl] derivatives and 1 wt % to 20 wt % TEPA curing agent. Alternatively, in a third nonlimiting example, the resinous composition may include 10 wt % to 80 wt % bisphenol-A-(epichlorohydrin) epoxy resin with the reactive diluent oxirane mono [($C_{12}$-$C_{14}$)-alkyloxy) methyl] derivatives, 10 wt % to 80 wt % 1,6-hexanediol diglycidyl ether, 1 wt % to 20 wt % TEPA. It should further be noted that commercial examples of suitable resins may include, but are not limited to, RAZEEN® 2254 and RAZEEN® 7106 (both available from Jubail Chemical Industries), WELLLOCK® R1 and WELLLOCK® R2 (both available from Halliburton).

Emulsifiers

Lost circulation materials of the present disclosure may optionally further include an emulsifier. Emulsifiers included in lost circulation materials of the present disclosure may serve to facilitate or otherwise stabilize an emulsion of components of the lost circulation materials in order to support mitigation of losses within a subterranean formation. If included in lost circulation materials, emulsifiers may be present at concentrations of 0.1 wt % to 20 wt %, or 0.5 wt % to 16 wt %, or 0.5 wt % to 15 wt %, or 0.5 wt % to 10 wt %, or 0.5 wt % to 5 wt %, or 0.5 wt % to 1 wt %, or 1 wt % to 15 wt %, or 1 wt % to 10 wt %, or 5 wt % to 15 wt %, or 5 wt % to 10 wt %, or 10 wt % to 15 wt %, or 10 wt % to 20 wt %, based on the total weight of the resinous composition. Examples of suitable emulsifiers may include, but are not limited to, oxyethylated alkyl phenol, ethoxylated phenol, modified tall oil fatty amide carboxylic acid terminated fatty polyamide, triethylenetetramine (TETA), tetraethylenepentamine (TEPA), diethylenetriamine (DETA), amidoamine, polyolefin amide alkene amine, transesterified diethanolamine, the like, or any combination thereof. Commercial examples of suitable emulsifiers and/or emulsifier products may include, but are not limited to, AKTAFLO®-E and AKTAFLO®-S, FACTANT™, BDF™ 535, BDF™ 536, BDF™ 537, BAROMUL® 290, BAROMUL® 303, BROMI-MUL®, DRILTREAT®, EZ-CORE™, EZ MUL® 2F, EZ MUL® NS, EZ MUL® NT, FORTI-MUL®, FORMULADE®, INVERMUL®, INVERMUL® NT, LE MUL®, LE SUPERMUL®, PERFOR MUL®, TORQ-TRIM® 22, TORQ®-TRIM II (all available from Halliburton), the like, or any combination thereof.

Other Additives

In some embodiments, lost circulation materials may contain at least one additional additive. The one or more additives may be any additives known to be suitable for lost circulation materials. As nonlimiting examples, suitable additives may include accelerators, retarders, extenders, fluid loss control agents, lost circulation control agents, surfactants, antifoaming agents, specialty additives such as elastomers or fibers, the like, or any combination thereof.

Introduction of Fluids

The lost circulation material of the present disclosure as described above may be introduced to a subterranean formation in any suitable manner, including in a series of fluids as described above, as a single combined fluid, the like, or any combination thereof.

The lost circulation material of the present disclosure may be introduced to a subterranean formation in one or more wellbore fluids (e.g., a drilling fluid). A "wellbore fluid," and grammatical variations thereof, as used herein, may include a base fluid and the lost circulation material of the present disclosure. The lost circulation material of the present disclosure may be included in a wellbore fluid in an amount of 5 percent volume by volume (% v/v) to about 95% v/v, encompassing any value and subset therebetween, such as 10% v/v to 90% v/v, 20% v/v to 80% v/v, 30% v/v to 70% v/v, 30% v/v to 90% v/v, encompassing any value and subset therebetween. The base fluid of the wellbore fluid may be any suitable fluid including, for example, an oleaginous fluid, an aqueous fluid, the like, or any combination thereof.

The oleaginous fluid may be any suitable fluid, such as oil or a solution containing both oil and one or more organic or inorganic compounds dissolved in the oil or otherwise completely miscible with the oil. The oleaginous fluid may include at least one naturally-derived or synthetically-derived oil. The oleaginous fluid may include oils derived from petroleum, such as mineral oils; diesel oils; linear or branched olefins; polyolefins; alkanes; paraffins; esters of fatty acids; straight chain, branched or cyclical alky ethers of fatty acids; other petroleum-derived oils; the like; or any combination thereof. The oleaginous fluid may contain esters, ethers, acetals, dialkylcarbonates, hydrocarbons, or combinations of any of these. The oleaginous fluid may also include oils derived from animals or plants, for example. The oleaginous fluid may also include other oils, such as, but not limited to, poly diorganosiloxanes, siloxanes, organosiloxanes, other silicone-based oils, the like, or any combination thereof.

An aqueous fluid included in wellbore fluids introduced to a subterranean formation according to the present disclosure may be any suitable fluid, as described above for the lost circulation materials, including water or a solution containing both water and one or more organic or inorganic compounds dispersed in the water.

The wellbore fluid may further include other components, which may include, but are not limited to, wetting agents, organophilic clays, viscosifiers, surfactants, dispersants, interfacial tension reducers or emulsifying agents, rheological modifies, pH buffers, mutual solvents, thinners, thinning agents, weighting agents, cleaning agents, the like, or any combination thereof.

Wellbore fluids comprising a base fluid, lost circulation materials of the present disclosure, and optionally other components may be used in a drilling operation or other such wellbore operation. For example, during a drilling operation, a drilling fluid is continuously pumped into a wellbore penetrating a subterranean formation to lubricate the drill bit and also to clear and clean the wellbore and the filings (also referred to as cuttings) resulting from drilling. The drilling fluid is typically pumped from a mud pit into the wellbore and returns again to the surface. An indication that a zone of interest (e.g., a depleted zone, zone of low pressure, lost circulation zone, fractured zone, or the like) has been encountered is when the flow rate of the drilling fluid that returns to the surface is less than the flow rate of the drilling fluid pumped into the wellbore. This reduction or absence of returning drilling fluid is referred to as lost circulation.

Wellbore fluids (including drilling fluids) comprising the lost circulation material of the present disclosure may be used for drilling all or portions of a wellbore. For example, the lost circulation material of the present disclosure may be added to wellbore fluids when a zone of interest is encountered. Fractured zones may include fractures that are natural or induced, vugular or cavernous, highly permeable, or unconsolidated. Alternatively, the lost circulation material of the present disclosure may be included in wellbore fluids regardless of encountering zone of interest.

Embodiments of the present disclosure will now be described in detail with reference to accompanying Figures. Like elements in the various Figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

FIG. 1 illustrates a nonlimiting example of a well site 100 having a wellbore 102 through the Earth's surface 104 into a subterranean formation 106 in the Earth's crust. To form the wellbore 102, a hole (e.g., a borehole) is drilled into the subterranean formation 106 to generate a drilled formation surface 108 as an interface for the wellbore 102 with the subterranean formation 106. The formation surface 108 may be characterized as the wellbore 102 wall. The wellbore 102 may have openhole portions but generally includes a cylindrical casing 110, as shown in FIG. 1. The wellbore 102 in the depicted implementation of FIG. 1 is a cased wellbore 102. In the illustrated nonlimiting example, the wellbore 102 has a lost circulation zone 112 caused by lost circulation features 114 of the subterranean formation 106 at that portion of the wellbore 102. The lost circulation features 114 along the wellbore 102 at the lost circulation zone 112 cause or contribute to the lost circulation. The lost circulation features 114 are structural features or characteristics of the subterranean formation 106 at or near the wellbore 102. The features 114 may include, but are not limited to, fractures, voids, vugulars (i.e., vugs), gaps, permeable channels, cavities, cavernous openings, the like, or any combination thereof.

In a drilling operation, a fluid (e.g., drilling fluid or drilling mud) is introduced from the surface 104 by flowing downward through the casing 110 and drill string (not shown), is discharged from the drill bit (not shown) at the bottom of the wellbore 102, and flows upward through the annulus between the subterranean formation 106 and the casing 110 toward the surface 104 as a return fluid. Some or all of the fluid flowing upward through the annulus may be lost through the features 114 into the subterranean formation 106 at the lost circulation zone 112 in the wellbore 102.

The lost circulation materials of the present application may be utilized to treat the lost circulation zone 112 to mitigate a flow of fluids from the wellbore into the subterranean formation. A wellbore fluid 116 (e.g., a drilling fluid) comprising the lost circulation materials of the present application may be introduced (e.g., pumped) into the wellbore 102. The wellbore fluid 116 may be pumped by at least one pump (e.g., a mud pump) of the surface equipment 118 at the surface 104. In certain implementations, the at least one pump may be associated with a drilling rig. The at least one pump may be skid-mounted in some instances. The at least one pump may include any suitable pump, including, but not limited to, for example, a centrifugal pump, a positive displacement pump, a reciprocating positive displacement pump (e.g., a piston pump or a plunger pump), or any combination thereof. The surface equipment 118 may include equipment (e.g., vessels, solid-handling equipment, piping, additional pumps, the like, or any combination thereof) to incorporate the lost circulation materials, solids (e.g., filler material, bridging material, other lost circulation material products), the like, or any combination thereof into the drilling fluid 116. The solids would be in addition to the lost circulation materials of the present disclosure. The surface equipment 118 may include equipment to support other operations at the well site 100.

The lost circulation material may be similarly introduced into the zone of interest in the form of a drilling pill, in which an amount of drilling fluid containing the lost circulation fluid is injected into the wellbore specifically as a lost circulation curing procedure. In general, a drilling pill may be a relatively small quantity or volume of drilling fluid as a specialized blend utilized for a particular purpose in treating the wellbore 102 or subterranean formation 106.

It should be noted that the lost circulation material may be introduced to the zone of interest in multiple fluids as described herein, with each fluid comprising a suitable fluid composition (e.g., a drilling fluid, a drilling pill, the like, or any combination thereof) as described herein. Methods of the present disclosure may include wherein introducing the lost circulation material to the zone of interest comprises introducing a first fluid and a second fluid, as described herein, the first fluid comprising the volcanic ash and the activator and the second fluid comprising the resinous composition. Methods of the present disclosure may include wherein introducing the lost circulation material to the zone of interest comprises introducing a combined fluid, as described herein, the combined fluid comprising the volcanic ash and the activator and comprising the resinous composition.

The wellbore fluid including the lost circulation material, when introduced into the wellbore, will enter a zone of interest, wherein the zone of interest, for example, may be a depleted zone, a zone of low pressure, a lost circulation zone, a fracture zone, or any combination thereof. Subsequently and/or simultaneously, curing agent in the lost circulation material may initiate the polymerization of the resinous composition and activator in the lost circulation material may initiate a polycondensation reaction of the volcanic ash. Furthermore the resinous composition may combine and react with such a slurry (including volcanic ash and activator), binding the resinous composition with the volcanic ash and at least partially solidifying the lost circulation material.

Lost circulation materials of the present disclosure may have a setting time (e.g., thickening time) at 100° F. of 1 hour to 48 hours, or 1 hour or greater, or 5 hours or greater, or 12 hours or greater, or 1 hour to 12 hours, or 1 hour to 24 hours. A thickening time test may be used to simulate pumping conditions in order to determine a length of time before lost circulation materials or fluids including lost circulation materials become difficult or impossible to pump. Example methods to determine thickening time may include testing using a pressurized consistometer, allowing pressure and temperature to be applied to a lost circulation material undergoing stirring (e.g., stirring at 150 rpm).

During stirring, a resistor arm on a potentiometer may be used to indicate resistance to the paddle turning as the lost circulation material at least partially solidifies. The pressurized consistometer may output in Bearden Consistency units.

The at least partial solidification may thereby mitigate a flow of fluids from the wellbore into the subterranean formation using the lost circulation material. Such at least partial solidification may, without being bound by theory, occur due to any suitable chemical and/or physical binding of the volcanic ash, the activator, the resinous composition, any additives, or any combination thereof. Mitigation of the flow of fluids may be referred to herein as a "fluidic seal," in which a barrier is formed to the flow of fluids (e.g., drilling fluids or other fluid types). A fluidic seal may form a barrier having a permeability of less than about 0.1 darcies, including complete sealing such that no fluid passes through the fluidic seal.

In some embodiments, at least partially solidified lost circulation materials may be capable of withstanding pressures of up to 4,000,000 pounds of force per square inch (psi) (1 psi equals 6.89476 kilopascals (kPa)). For example, in some embodiments, at least partially solidified lost circulation materials may be capable of withstanding pressures of from 14 psi to 4,000,000 psi without failing or deteriorating to allow liquids or gases to penetrate into or through the lost circulation material.

Lost circulation materials of the present disclosure, including at least partially solidified lost circulation materials of the present discourse, may be capable of withstanding a wide range of temperatures and pressures without failing or deteriorating. Failure or deterioration of the lost circulation materials may allow liquids or gases to penetrate into or through the lost circulation materials. For example, lost circulation materials, once at least partially solidified, may be capable of withstanding temperatures of 20 degrees Celsius (° C.) to 205° C. The at least partially solidified lost circulation materials may also be able to withstand temperature cycling, including temperature cycling within a temperature range of, for example, 20° C. to 205° C.

The rheology and density of lost circulation materials of the present discourse may be adjusted over a wide range of values depending on the requirement for the well and the downhole conditions of the well. Lost circulation materials may have a density that enables the lost circulation material to exert hydrostatic pressure on the wellbore wall or interior surface of an outer casing to support the wellbore, prevent fluids from flowing from the subterranean formation into the wellbore, or both. In some embodiments, lost circulation materials may have a density of from 55 pounds per cubic foot ($lbm/ft^3$) to 170 $lbm/ft^3$ measured immediately after addition of the curing agent and before substantial solidification has occurred. In some embodiments, lost circulation materials may have a density of 55 $lbm/ft^3$ to 150 $lbm/ft^3$, or 55 $lbm/ft^3$ to 130 $lbm/ft^3$, or 55 $lbm/ft^3$ to 110 $lbm/ft^3$, or 55 $lbm/ft^3$ to 90 $lbm/ft^3$, or 60 $lbm/ft^3$ to 170 $lbm/ft^3$, or 60 $lbm/ft^3$ to 150 $lbm/ft^3$, or 60 $lbm/ft^3$ to 130 $lbm/ft^3$, or 60 $lbm/ft^3$ to 110 $lbm/ft^3$, or 60 $lbm/ft^3$ to 90 $lbm/ft^3$, or 80 $lbm/ft^3$ to 170 $lbm/ft^3$, or 80 $lbm/ft^3$ to 130 $lbm/ft^3$, or 80 $lbm/ft^3$ to 110 $lbm/ft^3$, or 90 $lbm/ft^3$ to 150 $lbm/ft^3$, or 90 $lbm/ft^3$ to 130 $lbm/ft^3$. In some embodiments, lost circulation materials may have a density of from 55 $lbm/ft^3$ to 170 $lbm/ft^3$ measured immediately after combination of components thereof (e.g., volcanic ash, activator, resinous composition, and any additives) and before substantial solidification has occurred. As used here, "substantial solidification," and grammatical variations thereof, refers to an amount of solidification that produces a change of greater than 5 percent (%) in any rheological property of the composition.

Optionally, lost circulation materials may include a component (or additive), as described herein for the breakdown and removal of at least a portion of the fluidic seal. As used herein, the term "at least a portion," with reference to the breakdown and removal of the fluidic seal, and grammatical variants thereof, refers to restoring the zone of interest (e.g., lost circulation features of 114 of FIG. 1) in which the fluidic seal was formed to a permeability no less than about 75% of the original permeability of the zone of interest.

It is to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the well site 100 depicted generally in FIG. 1.

Additional Embodiments

Embodiments Disclosed Herein Include:

Embodiment 1. A method comprising: introducing a lost circulation material to a zone of interest in a subterranean formation via a wellbore, the zone of interest comprising depleted zones, zones of low pressure, lost circulation zones, fractured zones, or any combination thereof; wherein the lost circulation material comprises: volcanic ash, an activator, and a resinous composition; and solidifying, at least partially, the lost circulation material such that the solidified material at least partially blocks the wellbore from the zone of interest.

Embodiment 2. The method of Embodiment 1, wherein introducing the lost circulation material to the zone of interest comprises: introducing a first fluid comprising the volcanic ash and the activator; introducing a second fluid comprising the resinous composition; and contacting the first fluid and the second fluid within the subterranean formation so as to mix the volcanic ash, the activator, and the resinous composition.

Embodiment 3. The method of Embodiment 2, wherein the first fluid comprises a slurry.

Embodiment 4. The method of any one of Embodiments 1-3, wherein introducing the lost circulation material to the zone of interest comprises: forming a first fluid comprising the volcanic ash and the activator; forming a second fluid comprising the resinous composition; and contacting the first fluid and the second fluid to form a combined fluid prior to introduction to the subterranean formation so as to mix the volcanic ash, the activator, and the resinous composition; and introducing the combined fluid to the subterranean formation.

Embodiment 5. The method of any one of Embodiments 1-4, wherein the resinous composition comprises 50 wt % to 97 wt % resin, and wherein the resinous composition comprises 0.1 wt % to 20 wt % curing agent, the weight percentages based on a total weight of the resinous composition.

Embodiment 6. The method of any one of Embodiments 1-5, wherein solidifying, at least partially, the lost circulation material comprises: curing the resinous composition; and binding the resinous composition with the volcanic ash.

Embodiment 7. The method of any one of Embodiments 1-6, wherein the lost circulation material comprises 10 wt % to 90 wt % of the volcanic ash, by total weight of the lost circulation material.

Embodiment 8. The method of any one of Embodiments 1-7, wherein the lost circulation material comprises 10 wt % to 85 wt % of the activator, by total weight of the lost circulation material.

Embodiment 9. The method of any one of Embodiments 1-8, wherein the lost circulation material comprises 20 wt % to 99 wt % of the resinous composition, by total weight of the lost circulation material.

Embodiment 10. The method of any one of Embodiments 1-9, wherein the volcanic ash comprises Saudi Arabian volcanic ash.

Embodiment 11. The method of any one of Embodiments 1-10, wherein the volcanic ash comprises: $SO_3$, CaO, $SiO_2$, $Al_2O_3$, $Fe_2O_3$, MgO, and $K_2O$.

Embodiment 12. The method of any one of Embodiments 1-11, wherein the volcanic ash comprises: 42 wt % to 46 wt % $SiO_2$, 13 wt % to 17 wt % $Al_2O_3$, and 10 wt % to 15 wt % $Fe_2O_3$.

Embodiment 13. The method of any one of Embodiments 1-12, wherein the activator comprises sodium silicate, sodium hydroxide, or any combination thereof.

Embodiment 14. The method of Embodiment 13, wherein the sodium silicate and sodium hydroxide have a weight ratio of 0.30:1.00 to 0.90:1.00.

Embodiment 15. The method of any one of Embodiments 1-14, wherein solidifying, at least partially, the lost circulation material comprises: reacting the activator and the volcanic ash in a polycondensation reaction to form a sodium aluminosilicate hydrate.

Embodiment 16. The method of Embodiment 15, wherein the sodium aluminosilicate hydrate has a formula of

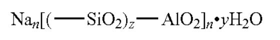

wherein n represents a degree of polymerization ranging from 1 to 50, z represents an amount of silicate ranging from 2 to 10, and y represents a molar amount of water ranging from 2 to 15.

Embodiment 17. The method of any one of Embodiments 1-16, wherein the resinous composition comprises a resin, wherein the resin comprises an epoxy resin, and wherein the epoxy resin comprises bisphenol-A-(epichlorohydrin) epoxy, 2,3-epoxypropyl-o-tolyl ether, $C_{12}$-$C_{14}$ alkyl glycidyl ether, 1,6-hexanediol diglycidyl ether, butyl glycidyl ether, cyclohexanedimethanol diglydicyl ether, or any combination thereof.

Embodiment 18. The method of any one of Embodiments 1-17, wherein the resinous composition comprises a curing agent, and wherein the curing agent comprises an amine, a polyamine, an amine adduct, a polyamine adduct, an alkanolamine, an amide, a polyamide, a polyamide adduct, a polyamide imidazoline, a polyaminoamide, a phenalkamine, a polymercaptan, or any combination thereof.

Embodiment 19. The method of any one of Embodiments 1-18, wherein the lost circulation material further comprises a weighting material, and wherein the weighting material comprises sand, barite (barium sulfate), hematite, calcium carbonate, siderite, ilmenite, silica sand, manganese oxide (MnO), hausmanite, manganese tetraoxide ($Mn_3O_4$), zinc oxide, zirconium oxide, iron oxide, or any combination thereof.

Embodiment 20. The method of any one of Embodiments 1-19, wherein the lost circulation material is a component of a wellbore fluid, a drilling fluid, a drilling pill, or any combination thereof.

EXAMPLES

Example 1

Wavelength Dispersive X-ray Fluorescence (WDXRF) may be used to conduct elemental analysis. In WDXRF spectrometers, all of the elements in the sample are excited simultaneously. The different energies of the characteristic radiation emitted from the sample are diffracted into different directions by an analyzing crystal or monochrometer (similar to the action of a prism dispersing different colors of visible light into different directions). By placing the detector at a certain angle, the intensity of X-rays with a certain wavelength can be measured. Sequential spectrometers use a moving detector on a goniometer to move said spectrometer through an angular range to measure intensities of many different wavelengths. Simultaneous spectrometers are equipped with a set of fixed detection systems, where each system measures the radiation of a specific element.

A Sample 1A of Saudi Arabian volcanic ash was homogenized and manually grounded by an agate mortar and a pestle for several minutes to achieve fine particle size. Then, 4 grams of Sample 1A powder was mixed well and homogenized with 0.9 grams of a binder (LICOWAX® C micropowder PM (available from Hoechstwax)). Then, the mixture was pressed with 20 tons of pressure to a pellet with 31 millimeter (mm) diameter.

WDXRF analysis was then performed on the sample using the standardless Omnian 27 method. The results of the WDXRF testing is shown in Table 1 below.

TABLE 1

WDXRF results of Sample 1A.

| Element | Wt % |
|---|---|
| O | 44.2 |
| Si | 21.8 |
| Al | 8.5 |
| Fe | 8.5 |
| Ca | 6.4 |
| Mg | 4.2 |
| Na | 3.1 |
| Ti | 1.5 |
| K | 1.0 |
| P | 0.3 |
| Mn | 0.1 |

The WDXRF results show that the sample consisted of mainly oxygen (O) and silicon (Si) with appreciable amounts of aluminum (Al), iron (Fe), calcium (Ca), magnesium (Mg), and sodium (Na).

Example 2

X-ray powder diffraction (XRD) is a rapid analytical technique primarily used for phase identification of a crystalline material and can provide information on unit cell dimensions. The analyzed material is finely ground, homogenized, and average bulk composition is determined. X-ray diffractometers consist of three basic elements: an X-ray tube, a sample holder, and an X-ray detector. X-rays are generated in a cathode ray tube by heating a filament to produce electrons, accelerating the electrons toward a target by applying a voltage, and bombarding the target material with electrons. When electrons have sufficient energy to dislodge inner shell electrons of the target material, characteristic X-ray spectra are produced. These spectra consist of several components, the most common being $K\alpha$ and $K\beta$. $K\alpha$ consists, in part, of $K\alpha1$ and $K\alpha2$. $K\alpha1$ has a slightly shorter wavelength and twice the intensity as $K\alpha2$. The specific wavelengths are characteristic of the target material (e.g., Cu, Fe, Mo, Cr). Filtering, by foils or crystal monochrometers, is required to produce the monochromatic X-rays needed for diffraction. $K\alpha1$ and $K\alpha2$ are sufficiently close in wavelength such that a weighted average of the two is used. These X-rays are collimated and directed onto the sample. As the sample and detector are rotated, the intensity of the reflected X-rays is recorded. A detector records and processes this X-ray signal and converts the signal to a count rate which is then output to a device such as a printer or computer monitor.

A Sample 2A of Saudi Arabian volcanic ash was homogenized and manually grounded by an agate mortar and a pestle for several minutes to achieve fine particle size. Then, 4 grams of Sample 2A powder were mounted into an XRD sample holder by back pressing. XRD was then performed on the sample using the SALAM 014 method. The results of the XRD testing is shown in Table 2 below.

TABLE 2

XRD Composition of Sample 2A.

| Compound | Wt. % |
|---|---|
| Amorphous Material | 70 |
| Labradorite: $Ca_{0.65}Na_{0.32}(Al_{1.62}Si_{2.38}O_8)$ | 19 |
| Augite: $Ca(Fe, Mg)Si_2O_6$ | 6 |
| Forsterite: $Mg_2SiO_4$ | 5 |

The XRD results show that the sample consisted mainly of amorphous material with appreciable amounts of labradorite, augite, and forsterite. The WDXRF results of Example 1 thus confirmed the XRD findings.

Example 3

A Sample 3A comprising geopolymer cement slurries were made in accordance with the previous description. Sodium silicate solution (having a weight ratio of $Na_2O$ to $SiO_2$ of 0.7 to 2.3) was obtained. Sodium hydroxide solution was formed at a concentration of 6 M (mol/L). Subsequently, the sodium silicate solution, the sodium hydroxide, and volcanic ash were combined with DI water in quantities listed in Table 3 below.

TABLE 3

Sample 3A composition.

| Component | Quantity | Unit |
|---|---|---|
| DI Water | 70 | ml |
| Sodium silicate solution | 65 | ml |
| Sodium hydroxide solution | 41.2 | ml |
| Volcanic Ash | 300 | g |

Components were mixed in an API blender for 15 seconds at 4,000 revolutions per minute (rpm) and 35 seconds at 12,000 rpm using a tabletop mixer. Sample 3A was tested for rheological properties with a FANN® Model 35 viscometer according to test methods provided in the API Recommended Practice For Field Testing Water-Based Cement slurries (RP 13B-1/ISO 10414-1:2002). Shear stress measurements were taken at various shear rates and additionally gel strength was measured at 10 seconds and 10 minutes. The shear rate was measured in revolutions per minute (rpm). Results of testing are shown in Table 4 below.

TABLE 4

Results of rheological testing.

| Test | Reading | Units |
|---|---|---|
| 600 rpm shear rate | 91 | lb-f/100 $ft^2$ |
| 300 rpm shear rate | 52 | lb-f/100 $ft^2$ |
| 200 rpm shear rate | 40 | lb-f/100 $ft^2$ |
| 100 rpm shear rate | 28 | lb-f/100 $ft^2$ |
| 6 rpm shear rate | 21 | lb-f/100 $ft^2$ |
| 3 rpm shear rate | 19 | lb-f/100 $ft^2$ |
| 10 sec gel strength | 31 | lb-f/100 $ft^2$ |
| 10 min gel strength | 110 | lb-f/100 $ft^2$ |

Example 4

An example epoxy resin Sample 4A was formed in accordance with the present disclosure. Components used and quantities are shown in Table 5 below. Components were mixed using a tabletop mixer.

TABLE 5

Sample 4A composition.

| Component | Quantity (g) |
|---|---|
| RAZEEN ® 2254 | 80 |
| RAZEEN ® D 7106 | 20 |
| Le Supermul | 7.75 |
| RAZEEN ® 931 | 3 |

RAZEEN® 2254 is available from Jubail Chemical Industries Company (headquartered in Jubail, Kingdom of Saudi Arabia) and includes Bisphenol-A-(epichlorohydrin) epoxy resin with the reactive diluent oxirane mono [($C_{12}$-$C_{14}$)-alkyloxy) methyl] derivatives, has an epoxy equivalent weight of 190 to 210, a dynamic viscosity of 600 to 900 cP at 25° C., and a density of 1.11 g/cc at 25° C. RAZEEN® D 7106 is available from Jubail Chemical Industries Company, has an epoxy equivalent weight of 270 to 305, a dynamic viscosity of 7 to 15 cP at 25° C., and a density of 0.89 g/cc at 25° C. LE SUPERMUL® is a polyaminated fatty acid emulsifier available from Halliburton (Houston, Texas). RAZEENCURE® 931 includes diethylenetriamine and is available from Jubail Chemical Industries Company.

Sample 4A was tested for rheological properties with a FANN® Model 35 viscometer according to test methods provided in the API Recommended Practice For Field Testing Water-Based Cement slurries (RP 13B-1/ISO 10414-1:2002). Shear stress measurements were taken at various shear rates and additionally gel strength was measured at 10 seconds and 10 minutes. The shear rate was measured in revolutions per minute (rpm). Furthermore, plastic viscosity and yield point were calculated according to Bingham plastic flow behavior, as indicated by Equations 3 and 4 below:

$$PV = \theta_{600} - \theta_{300} \qquad \text{Equation 3}$$

$$YP = \theta_{300} - PV \qquad \text{Equation 4}$$

where PV is the plastic viscosity (cP), YP is the yield point expressed as a force per area (lb-f/100 $ft^2$), $\theta_{600}$ is the viscometer shear stress (lb-f/100 $ft^2$) reading at 600 rpm, and $\theta_{300}$ is the viscometer shear stress (lb-f/100 $ft^2$) reading at 300 rpm. Results of testing for shear stress, plastic viscosity, and yield point testing are shown in Table 6 below.

TABLE 6

Results of rheological testing.

| Test | Reading | Units |
| --- | --- | --- |
| 600 rpm shear stress | 200 | lb-f/100 $ft^2$ |
| 300 rpm shear stress | 125 | lb-f/100 $ft^2$ |
| 200 rpm shear stress | 98 | lb-f/100 $ft^2$ |
| 100 rpm shear stress | 71 | lb-f/100 $ft^2$ |
| 6 rpm shear stress | 12 | lb-f/100 $ft^2$ |
| 3 rpm shear stress | 8 | lb-f/100 $ft^2$ |
| 10 sec gel strength | 45 | lb-f/100 $ft^2$ |
| 10 min gel strength | 120 | lb-f/100 $ft^2$ |
| Plastic Viscosity | 75 | cP |
| Yield Point | 50 | lb-f/100 $ft^2$ |

Example 5

Figure 2:
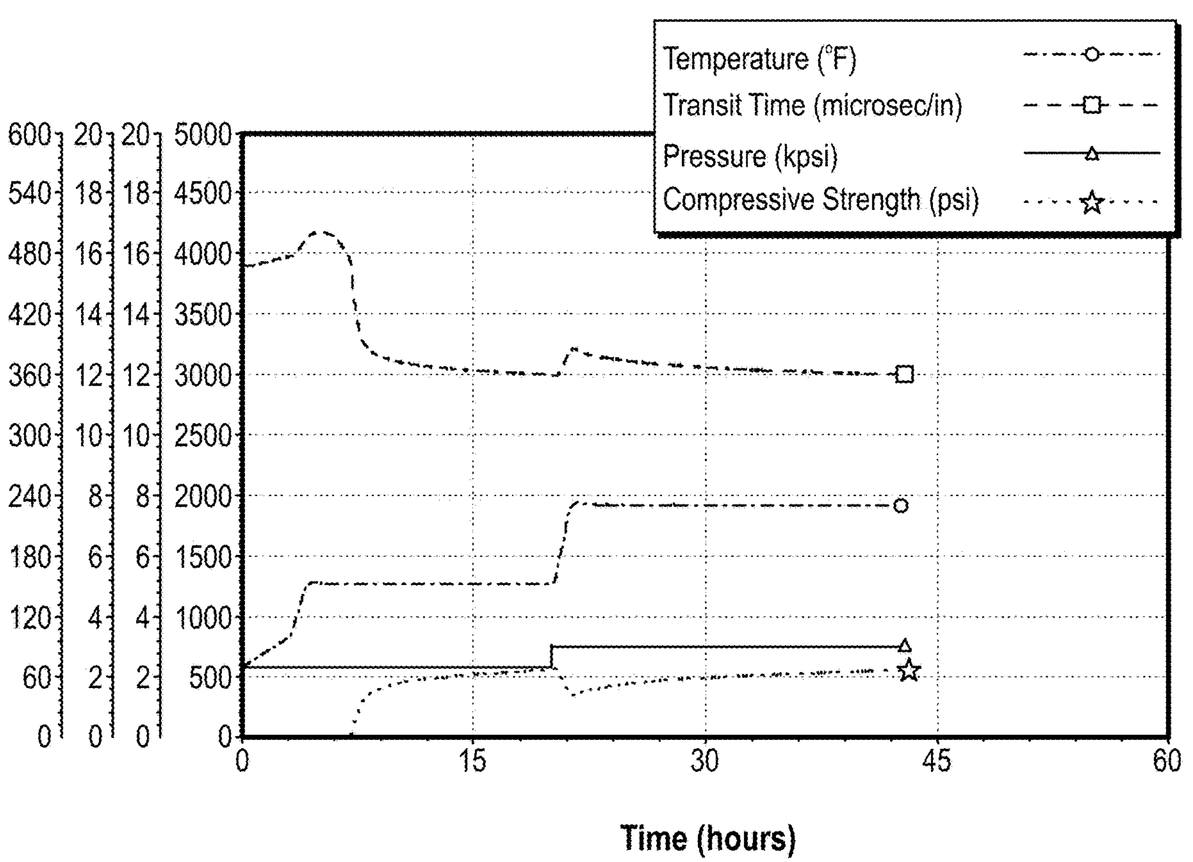
FIG. 2 is a graph of testing for an example in accordance with the present disclosure.
Figure 3A:
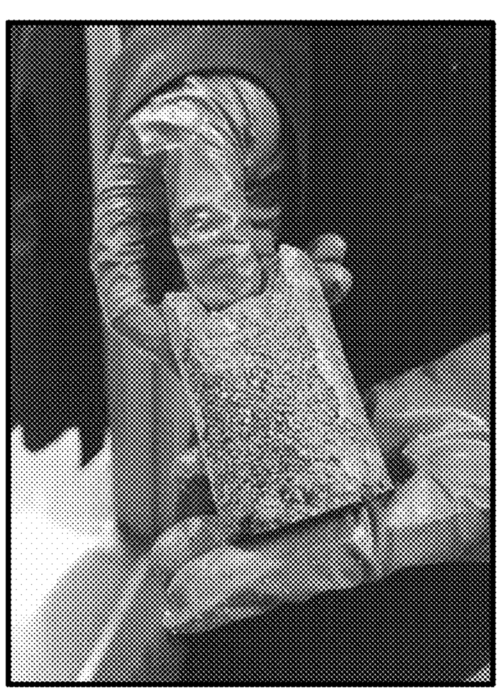
FIGS. 3A and 3B are images of testing of examples in accordance with the present disclosure.
Figure 3B:
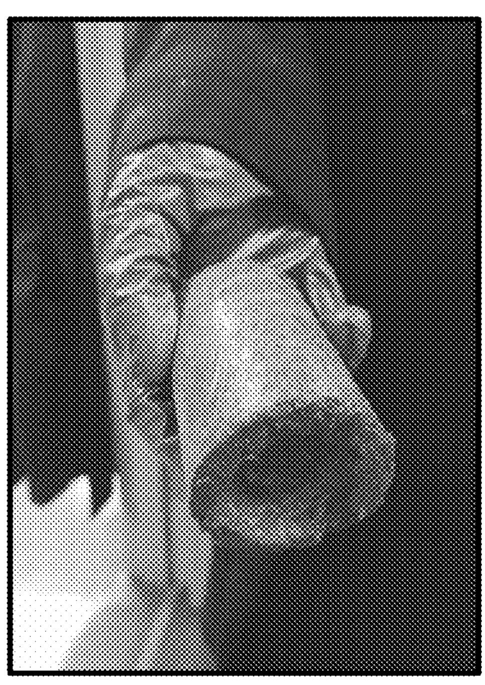

Lost circulation material Sample 5A including volcanic ash Sample 3A and epoxy resin Sample 4A was formed. Compressive strength for the lost circulation material Sample 5A was measured by a hydraulic press with a destructive crush test using API RP 10B procedure. Results of crush testing for Sample 5A are shown in FIG. 2. The compressive strength for Sample 5A was determined to be 2340 psi. Tested specimens of Sample 5A are shown in FIGS. 3A and 3B.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method comprising:

introducing a lost circulation material to a zone of interest in a subterranean formation via a wellbore, the zone of interest comprising depleted zones, zones of low pressure, lost circulation zones, fractured zones, or any combination thereof;

wherein the lost circulation material comprises:

volcanic ash, an activator, wherein the activator comprises sodium silicate, sodium hydroxide, or any combination thereof, and a resinous composition, and solidifying, at least partially, the lost circulation material such that the solidified lost circulation material at least partially blocks the wellbore from the zone of interest, wherein solidifying the lost circulation material comprises forming sodium aluminosilicate hydrate by a polycondensation reaction between the volcanic ash and the activator, followed by curing the resinous composition.

2. The method of claim 1, wherein introducing the lost circulation material to the zone of interest comprises:

introducing a first fluid comprising the volcanic ash and the activator;

introducing a second fluid comprising the resinous composition; and contacting the first fluid and the second fluid within the subterranean formation so as to mix the volcanic ash, the activator, and the resinous composition.

3. The method of claim 2, wherein the first fluid comprises a slurry.

4. The method of claim 1, wherein introducing the lost circulation material to the zone of interest comprises:

forming a first fluid comprising the volcanic ash and the activator;

forming a second fluid comprising the resinous composition; and contacting the first fluid and the second fluid to form a combined fluid prior to introduction to the subterranean formation so as to mix the volcanic ash, the activator, and the resinous composition; and introducing the combined fluid to the subterranean formation.

5. The method of claim 1, wherein the resinous composition comprises 50 wt % to 97 wt % resin, and wherein the resinous composition comprises 0.1 wt % to 20 wt % curing agent, the weight percentages based on a total weight of the resinous composition.

6. The method of claim 1, wherein solidifying, at least partially, the lost circulation material comprises:

curing the resinous composition; and binding the resinous composition with the volcanic ash.

7. The method of claim 1, wherein the lost circulation material comprises 10 wt % to 90 wt % of the volcanic ash, by total weight of the lost circulation material.

8. The method of claim 1, wherein the lost circulation material comprises 10 wt % to 85 wt % of the activator, by total weight of the lost circulation material.

9. The method of claim 1, wherein the lost circulation material comprises 20 wt % to 99 wt % of the resinous composition, by total weight of the lost circulation material.

10. The method of claim 1, wherein the volcanic ash comprises Saudi Arabian volcanic ash.

11. The method of claim 1, wherein the volcanic ash comprises: SO3, CaO, SiO2, Al2O3, Fe2O3, MgO, and K2O.

12. The method of claim 1, wherein the volcanic ash comprises:

42 wt % to 46 wt % SiO2, 13 wt % to 17 wt % Al2O3, and 10 wt % to 15 wt % Fe2O3.

13. The method of claim 1, wherein the sodium silicate and sodium hydroxide are present in a weight ratio of 0.30:1.00 to 0.90:1.00.

14. The method of claim 1, wherein the sodium aluminosilicate hydrate has a formula of

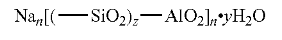

wherein n represents a degree of polymerization ranging from 1 to 50, z represents an amount of silicate ranging from 2 to 10, and y represents a molar amount of water ranging from 2 to 15.

15. The method of claim 1, wherein the resinous composition comprises a resin, wherein the resin comprises an epoxy resin, and wherein the epoxy resin comprises bisphenol-A-(epichlorohydrin) epoxy, 2,3-epoxypropyl-o-tolyl ether, C12-C14 alkyl glycidyl ether, 1,6-hexanediol diglycidyl ether, butyl glycidyl ether, cyclohexanedimethanol diglydicyl ether, or any combination thereof.

16. The method of claim 1, wherein the resinous composition comprises a curing agent, and wherein the curing agent comprises an amine, a polyamine, an amine adduct, a polyamine adduct, an alkanolamine, an amide, a polyamide, a polyamide adduct, a polyamide imidazoline, a polyaminoamide, a phenalkamine, a polymercaptan, or any combination thereof.

17. The method of claim 1, wherein the lost circulation material further comprises a weighting material, and wherein the weighting material comprises sand, barite (barium sulfate), hematite, calcium carbonate, siderite, ilmenite, silica sand, manganese oxide (MnO), hausmanite, manganese tetraoxide (Mn3O4), zinc oxide, zirconium oxide, iron oxide, or any combination thereof.

18. The method of claim 1, wherein the lost circulation material is a component of a wellbore fluid, a drilling fluid, a drilling pill, or any combination thereof.

19. The method of claim 1, wherein introducing the lost circulation material comprises injecting a drilling pill into the subterranean formation, and wherein the drilling pill comprises a mixture of a drilling fluid and the lost circulation material.

* * * * *